United States Patent
Bode

(10) Patent No.: US 9,746,085 B2
(45) Date of Patent: Aug. 29, 2017

(54) LABYRINTH SEAL AND METHOD FOR PRODUCING A LABYRINTH SEAL

(75) Inventor: Ralf Bode, Moers (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 660 days.

(21) Appl. No.: 13/510,052

(22) PCT Filed: Nov. 18, 2010

(86) PCT No.: PCT/EP2010/067751
§ 371 (c)(1),
(2), (4) Date: May 16, 2012

(87) PCT Pub. No.: WO2011/061253
PCT Pub. Date: May 26, 2011

(65) Prior Publication Data
US 2012/0228830 A1    Sep. 13, 2012

(30) Foreign Application Priority Data
Nov. 19, 2009 (DE) .................. 10 2009 053 954

(51) Int. Cl.
*F16J 15/44* (2006.01)
*F01D 11/02* (2006.01)
*F16J 15/453* (2006.01)

(52) U.S. Cl.
CPC .............. *F16J 15/445* (2013.01); *F01D 11/02* (2013.01); *F16J 15/453* (2013.01); *F05D 2300/121* (2013.01); *F05D 2300/171* (2013.01); *F05D 2300/43* (2013.01); *F05D 2300/509* (2013.01)

(58) Field of Classification Search
USPC .......... 277/412, 415, 416, 418–420, 303, 411
See application file for complete search history.

(56) References Cited

U.S. PATENT DOCUMENTS

| | | | | | |
|---|---|---|---|---|---|
| 1,010,770 | A | * | 12/1911 | Karlin | 277/412 |
| 1,720,696 | A | * | 7/1929 | Simpson | 277/346 |
| 1,779,076 | A | * | 10/1930 | Ray | 277/347 |
| 1,810,370 | A | * | 6/1931 | Ray | 277/412 |
| 2,907,595 | A | * | 10/1959 | Benson et al. | 277/303 |
| 3,311,343 | A | * | 3/1967 | Miller et al. | 415/230 |
| 3,339,933 | A | | 9/1967 | Foster | |
| 3,537,713 | A | | 11/1970 | Mulkin | |
| 3,614,112 | A | * | 10/1971 | Herzog et al. | 277/429 |
| 3,701,536 | A | | 10/1972 | Hamrick | |
| 3,755,870 | A | * | 9/1973 | Young et al. | 29/898.11 |
| 3,771,798 | A | * | 11/1973 | McDonald et al. | 277/412 |

(Continued)

FOREIGN PATENT DOCUMENTS

| | | |
|---|---|---|
| CN | 1515811 A | 7/2004 |
| DE | 4439950 A1 | 5/1996 |

(Continued)

*Primary Examiner* — Eugene G Byrd

(57) ABSTRACT

A labyrinth seal for sealing a sealing region between a rotor and stator of a rotary machine includes, a base, and a plurality of sealing rings. The sealing rings are formed on the base, project into the sealing region and form, between them labyrinth valleys bounded, laterally, by the sealing rings and, in the floor of the valleys, by the base. The sealing rings, in at least one region, include at least one material which is different from that of the base.

5 Claims, 1 Drawing Sheet

(56) References Cited

U.S. PATENT DOCUMENTS

| | | | |
|---|---|---|---|
| 4,148,494 A * | 4/1979 | Zelahy et al. | 277/415 |
| 4,169,020 A * | 9/1979 | Stalker et al. | 205/110 |
| 4,193,603 A * | 3/1980 | Sood | 277/304 |
| 4,257,617 A * | 3/1981 | Hill | 277/304 |
| 4,304,409 A * | 12/1981 | Orlowski | 277/558 |
| 4,466,620 A * | 8/1984 | Orlowski | 277/412 |
| 4,608,145 A * | 8/1986 | Fairbanks | 204/279 |
| 4,750,548 A * | 6/1988 | Albers et al. | 165/95 |
| 4,909,706 A * | 3/1990 | Bergsten et al. | 415/172.1 |
| 5,660,320 A | 8/1997 | Hoffmüller et al. | |
| 5,961,279 A * | 10/1999 | Ingistov | 415/170.1 |
| 5,984,314 A * | 11/1999 | Peters et al. | 277/417 |
| 6,000,701 A * | 12/1999 | Burgess | 277/412 |
| 6,843,482 B1 * | 1/2005 | Bayne | 277/412 |
| 6,933,018 B2 * | 8/2005 | Masuko | 427/402 |
| 6,969,231 B2 * | 11/2005 | Ghasripoor et al. | 415/173.4 |
| 7,220,168 B2 * | 5/2007 | Masuko | 451/42 |
| 7,597,538 B2 * | 10/2009 | Mons et al. | 415/174.5 |
| 7,645,117 B2 * | 1/2010 | Bracken et al. | 415/173.3 |
| 7,836,591 B2 * | 11/2010 | Allen et al. | 29/888.021 |
| 8,434,766 B2 * | 5/2013 | Zeng et al. | 277/419 |
| 2002/0117807 A1 * | 8/2002 | Yoshida et al. | 277/412 |
| 2003/0107181 A1 * | 6/2003 | Wieghardt | 277/415 |
| 2004/0119238 A1 * | 6/2004 | Skumawitz et al. | 277/412 |
| 2004/0126225 A1 | 7/2004 | Ghasripoor et al. | |
| 2005/0017458 A1 * | 1/2005 | Turnquist et al. | 277/412 |
| 2007/0040335 A1 * | 2/2007 | Kowalczyk | 277/412 |
| 2007/0132192 A1 * | 6/2007 | Chevrette | 277/412 |
| 2008/0136115 A1 * | 6/2008 | Johnson | 277/415 |
| 2011/0280715 A1 * | 11/2011 | Garg et al. | 415/174.5 |
| 2012/0043728 A1 * | 2/2012 | Zeng et al. | 277/412 |
| 2013/0049303 A1 * | 2/2013 | Orlowski et al. | 277/412 |
| 2013/0140774 A1 * | 6/2013 | Chochua et al. | 277/303 |

FOREIGN PATENT DOCUMENTS

| | | |
|---|---|---|
| DE | 10361499 A1 | 7/2004 |
| DE | 102007053631 A1 | 5/2009 |
| EP | 2058565 A1 | 5/2009 |
| GB | 651921 A | 4/1951 |
| GB | 2162200 A | 1/1986 |

* cited by examiner

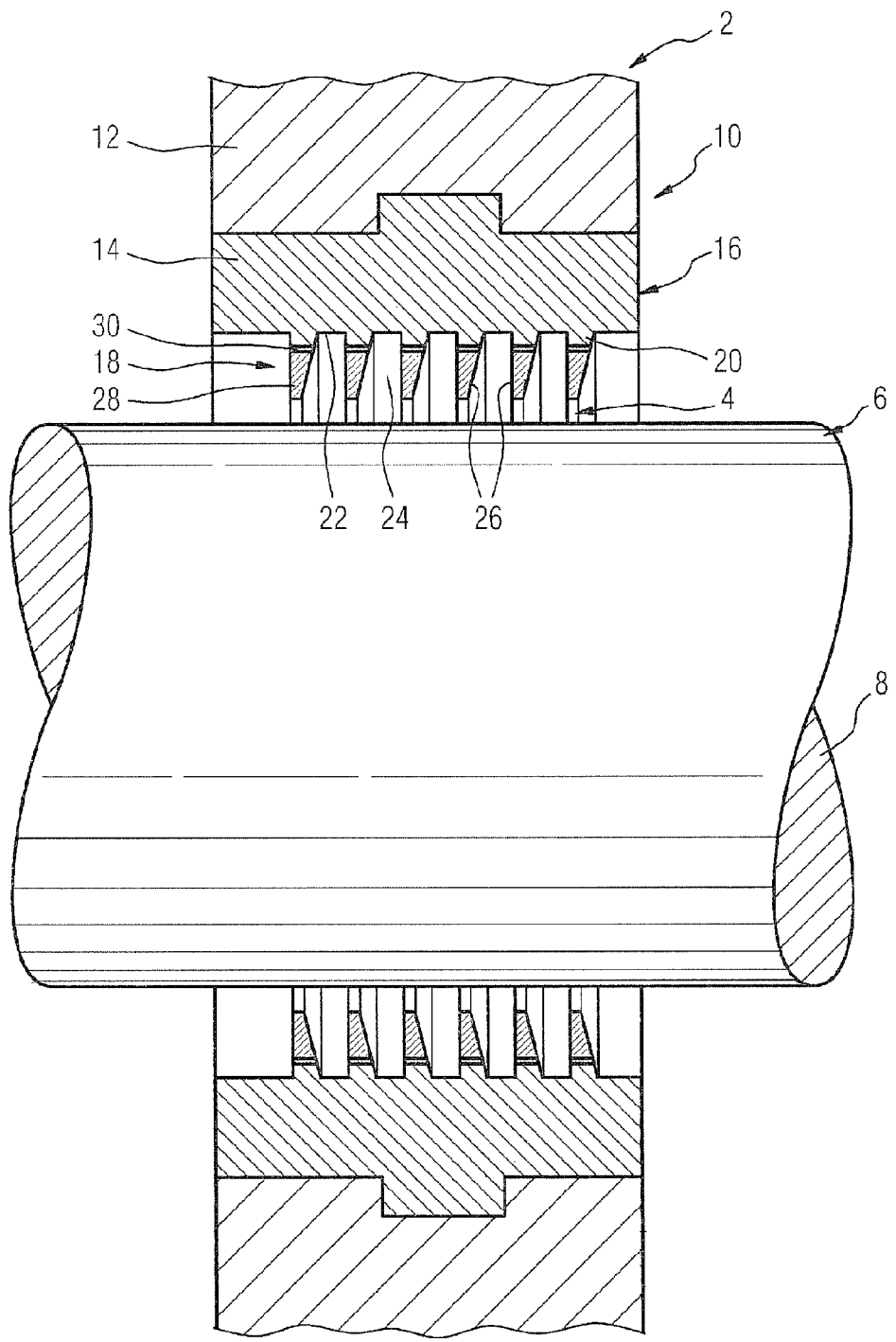

LABYRINTH SEAL AND METHOD FOR PRODUCING A LABYRINTH SEAL

CROSS REFERENCE TO RELATED APPLICATIONS

This application is the US National Stage of International Application No. PCT/EP2010/067751, filed Nov. 18, 2010 and claims the benefit thereof. The International Application claims the benefits of German application No. 10 2009 053 954.9 DE filed Nov. 19, 2009. All of the applications are incorporated by reference herein in their entirety.

FIELD OF INVENTION

The invention relates to a labyrinth seal for sealing a sealing region between a rotor and stator of a rotary machine, having a base and sealing rings which are formed on the base, project into a sealing region and form, between them, labyrinth valleys which are bounded, laterally, by the sealing rings and, in the floor of the valleys, by the base. The invention also relates to a method for producing a labyrinth seal for sealing a sealing region between a rotor and stator of a rotary machine.

BACKGROUND OF INVENTION

Rotary machines, such as fluid flow machines or turbo machines, have to be sealed at locations at which different pressures prevail, in order that leakages, which result in losses of efficiency, remain at as low a level as possible. Seals between a rotating part, e.g. a shaft, and a stator part, such as a housing part, are often configured as a contactless labyrinth seal. It is necessary here, with account being taken of thermal expansion, centrifugal expansion and radial vibration of the rotor, and with critical speeds being executed, for the amount of sealing play in the radial direction not to be too small. A sealing gap which is too small results in rubbing and thus in damage to the labyrinth tips and, in the worst case scenario, in deformation of the rotor.

The prior art discloses resilient sealing segments for a labyrinth seal which yield when rubbing takes place, and thus avoid significant damage.

SUMMARY OF INVENTION

It is an object of the invention to specify a labyrinth seal, and a method for producing a labyrinth seal, which can counteract rubbing induced damage to the rotor.

The object directed to the labyrinth seal is achieved by a labyrinth seal of the type mentioned in the introduction in the case of which the sealing rings according to the invention, at least in one region, consist of at least one material which is different from that of the base, in particular from that of the base in the region of the floor of the valleys. More advantageously, the different material is softer than the rotor material in the region of the labyrinth seal.

The invention proceeds from the consideration that, in particular if use is made of a smooth gap labyrinth seal in which the labyrinth tips are placed in the stator, it is expedient for any tips which may possibly rub to be produced from a softer material than the rotor material. Undesirable rubbing results in damage to the sealing tips, which are generally easier to repair or exchange than the rotor component located opposite. Aluminum alloys, which have an advantageous rubbing behavior in relation to rotor parts made of steel, are particularly suitable.

However, the disadvantage with most soft materials, in particular most aluminum alloys, is that their coefficient of thermal expansion is approximately double that of steel. Moreover, the level of rigidity is relatively low, and therefore a more rigid base or sealing insert should be used. The different coefficients of expansion here mean that a durable connection between a front, tip forming soft region and the base is difficult to make.

On account of the invention, only the sealing rings consist, and in particular only one region of each sealing ring consists, of the different material. A connecting surface between the material of the base, which may serve as a seal carrier or sealing insert, and the different material can thus be kept very narrow, and therefore the different coefficients of expansion result in just low levels of stressing between the different materials.

The rotary machine may be a fluid flow machine, such as a turbine or a compressor, or some other turbo machine, such as a generator. It is possible for the base to be a seal carrier or a seal insert on a seal carrier or to comprise both elements. The sealing rings are advantageously arranged on the stator and directed toward the rotor. They project into the sealing region, which is located between the rotor and the stator, in the region of the labyrinth seal.

The labyrinth seal may be configured as an uneven labyrinth seal, with sealing rings arranged alternately on the rotor and stator, or as a smooth gap labyrinth seal, with rings only on the rotor or on the stator. The sealing rings may be in one or more parts and form labyrinth tips oriented in the direction of the sealing region, wherein a labyrinth tip, rather than having to bear a pointed tip, may have a linear, in particular circular, tip region. The term "labyrinth tip" can be used as a synonym for sealing ring and stands not just for a tip region, but also for an entire, for example annular, element oriented in the direction of the sealing region.

The sealing rings or labyrinth tips form, between them, labyrinth chambers or labyrinth valleys, in which gas which flows through the labyrinth seal swirls, and the route taken by the gas as it runs through the labyrinth seal is thus long. The floor of the labyrinth valleys is formed by the base and thus from base material. The labyrinth seal may thus be configured such that the different material is always interrupted by base material between the sealing rings, and therefore the connecting surface between the base material and differing material is always small or narrow.

The region in which the sealing rings consist of the different material is expediently the region of the sealing rings oriented toward the sealing region, that is to say bounding the same directly. This region may be configured in one or more layers, wherein the layer is expediently the foremost material layer of the sealing rings. The different material may thus be constructed in one or more layers, wherein, in the case of a plurality of layers, each layer consists of a single material and these materials differ from one another.

The different material is expediently softer than the material of the rotor in the region of the labyrinth seal. Metal alloys or polymer materials are particularly suitable. In an advantageous embodiment of the invention, the sealing rings are produced from aluminum or an aluminum alloy. These materials allow rubbing damage to be kept to a low level. The base is expediently made of steel, in order to ensure a high level of rigidity. If use is made of a polymer material, polyetheretherketone (PEEK) or polyimide (PI) is particularly advantageous.

It is expediently the case that only a front region of the sealing rings in each case is produced from the different material. This makes it possible to connect a small connecting surface, in particular in the case of sealing rings becoming narrower toward the front, with a good level of rigidity for the labyrinth tips. A connecting surface between the base material and the different material thus runs within a sealing ring, or within the sealing rings, and in particular further toward the front, that is to say further toward the rotor, than the floor of the valleys.

Rubbing damage can be reduced even further if the different material contains a solid lubricant. Advantageous solid lubricants are graphite and graphite like substances, such as molybdenum disulfide (MoS2) and α-boron nitride (BN).

The solid lubricant may be present in the rest of the different material in the form of islands of a particle size of, for example, more than 10 μm.

An adhesion promoting intermediate layer, made of a third material, between the base material and the different material makes it possible to achieve a very firm and durable integral connection between the base material and the different material.

The object directed to the method is achieved by a method for producing a labyrinth seal for sealing a sealing region between a rotor and stator of a rotary machine, and in the case of which, according to the invention, a base is created and then sealing rings are formed thereon, the sealing rings being oriented in the direction of a sealing region and consisting, at least in certain regions, of at least one material which is different from that of the base. This makes it possible for floors of the labyrinth valleys, which are formed between the sealing rings, to be formed from the base material, and therefore the different material is always interrupted by the base material in the region of the floors of the valleys.

The base may be a bushing—prior to completion, a blank of a bushing—which has the sealing rings formed on its inside. It may comprise a seal carrier and a sealing insert, with the sealing rings located on its front side, wherein the direction runs toward the front in the direction of the sealing region. The sealing rings may consist partly of the base material and partly of the different material. The different material may comprise, in certain regions, various materials, e.g. an intermediate material, which is adjacent to the base material and forms an intermediate layer, and a rubbing material, which is prepared for rubbing purposes, is connected to the intermediate layer and is adjacent to the same. The operation of forming on the sealing rings can take place by virtue of the different material being added onto the base material, and if appropriate shaping work, e.g. cutting work. Expediently, the first step is to create the base, possibly as a blank, and then the sealing rings are formed on. It is likewise conceivable for the base and sealing rings to be produced simultaneously by a joint method.

The operation of forming on the sealing rings can take place by virtue of the base material being clad with the different material. The sealing rings can be completed by subsequent mechanical processing. Cladding can take place by virtue of the different material being rolled, welded or cast onto the base material, by virtue of the base material being dipped into the different material or by electroplating. The different material is expediently applied by explosion cladding, and this achieves a very durable connection between the materials.

Cladding may comprise the two materials being rolled one onto the other, wherein the materials here are expediently rolled in planar form and are subsequently deformed from, for example, a planar form into the form of a base, e.g. a bushing. Subsequent cutting work can expose the base material in the floors of the valleys, and the sealing rings can be completed in this way.

A further advantageous option resides in application of the different material by electroplating and/or by application of the different material to the base by centrifugal casting, and subsequent mechanical processing.

The methods which have been mentioned hitherto, and those which will be mentioned hereinbelow, can be used as an alternative to one another or in combination with one another, e.g. by the different material consisting of a plurality of different layers produced by different methods.

If the sealing rings are produced by virtue of the different material being thermally injected onto the base material, then it is easily possible to make a firm connection between the materials. A further method resides in the application of the different material to the base material as a powder, and subsequent sintering of the powder. It is likewise advantageous for the sealing rings to be formed on by diffusion welding of the different material onto the material of the base. In the case of all the methods, the different material can be compressed by hot isostatic pressing, and thus rendered capable of being subjected to high mechanical loading.

In the case of some of the methods mentioned, it is advantageous to select the geometry of the base and of the different material during production of the sealing rings such that differences in the thermal expansion behavior of the base material and different material, when the two materials are heated, result in the different material being forced into the base material. This can help to make a firm connection between the materials.

Instead of the sealing rings, or regions thereof, being created from the liquid phase, it is possible for a multi part body made of the different material to be introduced into the bushing form base and connected integrally to the bushing.

DETAILED DESCRIPTION OF INVENTION

The invention will be explained in more detail with reference to an exemplary embodiment illustrated in the drawing. The single FIGURE of the drawing shows part of a labyrinth seal 2 configured as a smooth gap seal. The labyrinth seal 2 seals a sealing region in the form of a gap 4 between a rotor 6, of which part of a shaft 8 of a turbocompressor is illustrated, and a fixed location stator 12, sealing here taking place in part, if not in full. The labyrinth seal 2 comprises a seal carrier 12, which bears a sealing insert 14 in the direction of the rotor 6. The seal carrier 12 and sealing insert 14 are constituent parts of the stator 10 and are therefore likewise fixed in location.

The seal carrier 12, together with the sealing insert 14, forms a base 16, which bears six sealing rings 18, which are formed in one piece from the base 16. The base 16 and the sealing rings 18 encircle the shaft 8, wherein the gap 4 between the sealing rings 18 and the shaft 8 remains around the shaft 8. This gap 4 leaves the shaft 8 free space in order to be able to vibrate without rubbing against the sealing rings 18. However, if the vibrations are more pronounced than the width of the gap 4, rubbing nevertheless takes place.

In order to avoid damage to the shaft 8 in the event of rubbing, the sealing rings 18 are produced from a number of materials. The bottom 20 of the sealing rings, at the rear, that is to say oriented away from the shaft, is formed from the material of the sealing insert 14—the base material. This base material is a suitable steel. As can be seen from the FIGURE, this material forms the floors 22 of the labyrinth valleys 24, which are arranged between the sealing rings 18 and are bounded, externally or at the rear in each case, by the floor 22 of the valleys and, laterally, by the flanks 26 of the adjacent sealing rings 18.

At the front, that is to say in the direction of the rotor 6, the sealing rings 18 are formed from different material 28, that is to say from an aluminum alloy. A particularly advantageous material 28 is an aluminum/silicon alloy, in particular with 12%±1% silicon. The silicon means that the coefficient of thermal expansion is around $21 \times 10^{-6}/K \pm 2 \times 10^{-6}/K$, and thus in the vicinity of that of stainless steel, which is around $18 \times 10^{-6}/K$. This means that thermal stressing between the base material and the different material 28 is kept to a low level, even in the event of pronounced fluctuations in temperature, as may occur, for example, in the case of rubbing. This counteracts breakage of the front part of a sealing ring 18 or of a labyrinth tip.

It is likewise advantageous for the strength of the sealing rings 18 if the boundary surface between the different material 28 and the base material is narrow, that is to say is small. Even with different coefficients of expansion, the level of stressing between the materials remains low, even in the event of pronounced fluctuations in temperature.

The different material 28 comprises two material zones of differing materials. The front part, which is oriented in the direction of the gap 4 and thus in the direction of the sealing region, is the aluminum alloy and the rear part is an intermediate layer 30, which promotes adhesion between the base material and the different material 28, in this exemplary embodiment between the steel and the aluminum alloy. A particularly suitable intermediate layer 30 is a zinc layer, which can be applied to the steel by hot galvanization of the steel. Likewise suitable is a nickel layer, which can be electroplated onto the steel.

In the event of the rotor 6 rubbing the stator 10 in the region of the labyrinth seal 2, the shaft 8 and the front region of the sealing rings 18 made of the aluminum alloy come into contact with one another. The aluminum alloy is considerably softer than the steel of the shaft 8, and therefore material deformation occurs, for the most part, on the sealing rings 18, and there only in the front region made of the aluminum alloy material 28. Damage to the shaft 8 thus remains at a low enough level for repair not to be necessary. Depending on the deformation of the sealing rings 18, and/or on the amount of material removed therefrom, these sealing rings have to be replaced, in which case the sealing insert 14 with the sealing rings 18 is exchanged.

In order, nevertheless, to keep damage to the shaft 8, but also to the labyrinth tips, to an even lower level, the aluminum alloy is provided with the solid lubricant. The latter is present in the form of α-boron nitride (BN), which is present in the surrounding aluminum alloy in the form of small islands measuring a number of μm in size. This solid lubricant reduces the sliding friction between the labyrinth tips and shaft 8, and therefore deformation of the labyrinth tips and removal of material therefrom are reduced.

In order to produce the labyrinth seal 2, in the first instance the base 16 is produced in the form of a bushing. The operation of forming the sealing rings on the base material then takes place in a first step, by the different material being applied in the form of an inner layer of powder to the base material and being retained there, for example with the aid of a shaping enclosure. Subsequent sintering of the powder forms the inner layer into a cohesive layer. Thereafter, hot isostatic pressing compresses at least an outer layer of the aluminium alloy and closes pores.

In a later step, the sealing rings are formed from the compact inner layer by the labyrinth valleys being cut into the inner layer and also, in part, into the base material, the floors 22 of the valleys therefore being positioned in the base material. The completed sealing insert 14 is introduced into the seal carrier 12 and the labyrinth seal 2 is thus transferred to its site of use.

An alternative method comprises the initial processing step of the base 16 being created in the form of a bushing. Then, the different material 28 is introduced as a multi part body into the bushing. The two materials are connected integrally to one another by diffusion welding. The geometry of the base 16 and of the different material 28 here is selected such that the greater coefficient of thermal expansion of the aluminum, which is used in this exemplary embodiment, or of the aluminum alloy results in the different material 28 expanding to a more pronounced extent than the base material, and therefore, when the two materials are heated, the different material is forced into the base material. This promotes the connection, established by diffusion welding, between the two materials, and therefore the connection made as firmer than one which does not involve one material being forced into the other.

The invention claimed is:

1. A labyrinth seal for sealing a sealing region between a rotor and stator of a rotary machine, comprising:
    a base, and
    a plurality of sealing rings which are formed on the base, project into the sealing region and form, between them labyrinth valleys bounded, laterally, by the sealing rings and, in a floor of the valleys, by the base,
    wherein the sealing rings, in at least one region, comprise at least one material which is different from that of the base,
    wherein the different material is softer than a rotor material in a region of the labyrinth seal, and
    where an adhesion-promoting intermediate layer made of a third material is present between the base material and the different material.

2. The labyrinth seal as claimed in claim 1, wherein the sealing rings, in said region, comprise an aluminum alloy and the base comprises steel.

3. The labyrinth seal as claimed in claim 2, wherein the sealing rings, in said region, comprise a polymer material.

4. The labyrinth seal as claimed in claim 1, wherein only a front region of the sealing rings is produced from the different material.

5. The labyrinth seal as claimed in claim 1, wherein the different material contains a solid lubricant.

* * * * *